US009615247B2

(12) United States Patent
Niewczas et al.

(10) Patent No.: US 9,615,247 B2
(45) Date of Patent: Apr. 4, 2017

(54) REDUNDANCY VERSION SELECTION BASED ON RECEIVING QUALITY AND TRANSPORT FORMAT

(71) Applicant: Telefonaktiebolaget L M Ericsson (publ), Stockholm (SE)

(72) Inventors: Jaroslaw Niewczas, Jozefow (PL); Andreas Cedergren, Bjärred (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 155 days.

(21) Appl. No.: 14/376,640

(22) PCT Filed: Jan. 22, 2013

(86) PCT No.: PCT/EP2013/051138
§ 371 (c)(1),
(2) Date: Aug. 5, 2014

(87) PCT Pub. No.: WO2013/120669
PCT Pub. Date: Aug. 22, 2013

(65) Prior Publication Data
US 2015/0029970 A1 Jan. 29, 2015

Related U.S. Application Data

(60) Provisional application No. 61/598,997, filed on Feb. 15, 2012.

(30) Foreign Application Priority Data

Feb. 14, 2012 (EP) .................................... 12155290

(51) Int. Cl.
*H04W 8/30* (2009.01)
*H04L 1/00* (2006.01)
*H04L 1/18* (2006.01)

(52) U.S. Cl.
CPC ............. *H04W 8/30* (2013.01); *H04L 1/0006* (2013.01); *H04L 1/0026* (2013.01);
(Continued)

(58) Field of Classification Search
CPC ...................................................... H04L 1/1812
See application file for complete search history.

(56) References Cited

U.S. PATENT DOCUMENTS 7,509,555 B2 3/2009 Ishizaki
8,432,794 B2 4/2013 Terry et al.
(Continued)

FOREIGN PATENT DOCUMENTS

GB 2477537 A 8/2011
JP 2006094318 A 4/2006
(Continued)

*Primary Examiner* — Huy D Vu
*Assistant Examiner* — Teisha D Hall
(74) *Attorney, Agent, or Firm* — Coats and Bennett, PLLC

(57) ABSTRACT

The embodiments herein relate to a method in a base station (101) for transmitting a transport block to a user equipment (105) in a communications network (100). The transport block comprises a plurality of bits. The base station (101) selects (203a, 203b, 401) a transport format. The base station (101) dynamically selects (204a, 203b, 402) a first redundancy version parameter based on a decoding performance for the transport block. The base station (101) transmits (205a, 204b, 404) the transport block comprising the plurality of bits distributed according to the dynamically selected first redundancy version parameter and according to the selected transport format in a first transmission to the user equipment (105).

20 Claims, 7 Drawing Sheets

(52) U.S. Cl.
CPC .......... *H04L 1/0033* (2013.01); *H04L 1/1812* (2013.01); *H04L 1/1819* (2013.01)

(56) References Cited

U.S. PATENT DOCUMENTS

| | | | | |
|---|---|---|---|---|
| 2006/0075319 A1* | 4/2006 | Ratasuk | ................ | H04L 1/0001 714/752 |
| 2013/0272270 A1* | 10/2013 | Pietraski | ................ | H04J 13/00 370/335 |
| 2015/0139158 A1* | 5/2015 | Wengerter | ............ | H04L 1/1893 370/329 |

FOREIGN PATENT DOCUMENTS

| | | | |
|---|---|---|---|
| JP | 2009522870 A | 6/2009 |
| WO | 2006030019 A2 | 3/2006 |
| WO | 2008044985 A1 | 4/2008 |
| WO | 2009132204 A2 | 10/2009 |

\* cited by examiner

REDUNDANCY VERSION SELECTION BASED ON RECEIVING QUALITY AND TRANSPORT FORMAT

TECHNICAL FIELD

Embodiments herein relate generally to a base station and a method in the base station. More particularly the embodiments herein relate to transmitting a transport block from a base station to a user equipment in a communications network.

BACKGROUND

In a typical cellular network, also referred to as a communications system or a communications network, one or more User Equipments (UE) communicates via a Radio Access Network (RAN) to a Core Network (CN).

A user equipment is a mobile terminal by which a subscriber may access services offered by an operator's core network and services outside the operator's network to which the operator's radio access network and core network provide access. The user equipment may be for example a communication device such as a mobile telephone, a cellular telephone, a smart phone, a tablet computer or a laptop with wireless capability. The user equipment may be portable, pocket-storable, hand-held, computer-comprised or vehicle-mounted mobile devices, enabled to communicate voice and/or data, via the radio access network, with another entity, such as for example another user equipment or a server.

The user equipment is enabled and configured to communicate wirelessly in the communications network. The communication may be performed e.g. between two user equipments, between a user equipment and a regular telephone and/or between the user equipment and a server via the radio access network and possibly one or more core networks, comprised within the communications network.

The communications network covers a geographical area which is divided into cell areas, and may therefor also be referred to as a cellular network. Each cell area is served by a base station, e.g. a Radio Base Station (RBS), which sometimes may be referred to as e.g. evolved Node B (eNB), eNodeB, NodeB, B node or Base Transceiver Station (BTS), depending on the technology and terminology used. The base station communicates over the air interface operating on radio frequencies with the user equipment(s) within range of the base station.

Modulation is used in communications networks and relates to the way information is superimposed on a radio carrier. A radio carrier needs to be modulated so that it may convey information from one device to another.

One type of modulation is Quadrature Amplitude Modulation (QAM). QAM conveys two analog message signals or two digital bit streams, by changing, i.e. modulating, the amplitudes of two radio carrier waves, using an Amplitude-Shift Keying (ASK) digital modulation scheme or an Amplitude Modulation (AM) analog modulation scheme. The two radio carrier waves are shifted in phase by 90° and modulated, and are therefore called quadrature carriers or quadrature components. The modulated resultant output comprises both amplitude and phase variations.

There are different forms of QAM, such as e.g. 16 QAM, 32 QAM, 64 QAM, 128 QAM, and 256 QAM. The numbers 16, 32, 64 etc. refer to the number of points in a constellation diagram. A constellation diagram is a representation of a signal modulated by a digital modulation scheme such as QAM. It displays the signal as a two-dimensional scatter diagram in the complex plane at symbol sampling instants. It may also be seen as a representation of the possible symbols that may be selected by a given modulation scheme as points in the complex plane.

In a communications network, the user equipment and the base station communicate by means of several channels. The channels are used to separate different types of data. The data channels may be grouped into three categories: a physical channel, a transport channel and a logical channel. Each category of data channel may be uplink or downlink, where uplink is in the direction from the user equipment to the base station and where downlink is in the direction from the base station to the user equipment. The logical and transport channels define which data is transported, while the physical channels define with which physical characteristic the data is transported. In more detail, the transport channel provides transportation of data to Medium Access Control (MAC) and higher layers. A transport block comprises data bits and is an entity exchanged between the MAC and the physical layer via the transport channel. The number of bits in a transport block is referred to as transport block size. A transport block may be segmented into code blocks. In each Transmission Time Interval (TTI), the MAC delivers a given number of transport blocks for each of the transport channels multiplexed together according to a Transport Format Combination (TFC) to the physical layer. The physical layer executes a set of processes to map the transport blocks onto the available physical resources (i.e. carrier frequency, code sequence and radio frame). Segmentation of the bit sequence from transport block concatenation is performed if $X\_i > Z$, where $X\_i$ is the number of bits input to the segmentation and $Z$ is a maximum code block size. The number of code blocks is $C\_i = X\_i / Z$. The code blocks after segmentation are of the same size.

A transport format is a format offered by the physical layer to the MAC, and vice versa, for the delivery of a transport block during a TTI on a transport channel.

Hybrid Automatic Repeat reQuest (HARQ) is a technique used to detect and correct errors. If the channel quality is sufficiently good relative to the transport format selected, the incurred transmission errors are correctable and the receiver is able to decode the transport block correctly. In that case, an ACKnowledgement (ACK) is sent by the user equipment and received by the base station. If the channel quality is poor, relative to the transport format selected, not all transmission errors may be corrected, the receiver will request a retransmission of the transport block, i.e. no ACK is received. The received data from the retransmission is combined with the data from the first (or previous) transmissions stored in the HARQ buffer to improve the successful decoding probability. Some aspects of the first transmission and of the retransmissions are determined by a Redundancy Version (RV) parameter controlled by the base station. Support signalling for the HARQ function involves transmitting for example the redundancy version parameter and information about the transport block size. In chapter 4.6.2.1 ("Redundancy and constellation coding") in the Third Generation Partnership Project Technical Specification (3GPP TS) 25.212 the version parameter parameter is described for Wideband Code Division Multiple Access (WCDMA)/High-Speed Downlink Packet Access (HSPA). HARQ is used in standards such as e.g. WCDMA, HSDPA and Long Term Evolution (LTE).

As wireless standards evolved, higher order modulations were introduced to increase the amount of data transmitted per time unit and bandwidth, such as e.g. 16QAM and 64QAM. For efficient processing, the large amount of transmit data is divided into several smaller transmit data segments, after which, each of them has been individually forward error correction encoded. In case of WCDMA this corresponds to the segmentation of a transport block into code blocks, and Turbo encoding of the code blocks. While the maximum transport block size grew with evolving standards, the maximum code block sizes remained the same, and the maximum code block size is 5114 bits in the example of WCDMA.

A soft bit value (aka. a soft bit, a soft value, a Log-Likelihood Ratio (LLR) value) is a real number which indicates the likelihood that the given bit was sent as 1 or 0. A large negative value, for example, −100, may imply a high likelihood for the bit is 0 and +100 may imply a high likelihood for the bit to be 1. The bits carried by the QAM symbols have different reliabilities. The soft bit values, describing the transmitted bits with different reliability, are partitioned between code blocks in a transport block. In 16QAM and 64QAM modulations not all de-mapped soft bits carry the same quality and reliability in a decoding process, due to the way the bits are mapped on to a constellation diagram. For example in 64QAM, soft bits index 0 and 1 define the I/Q half-planes and are the most reliable bits. Soft bits index of 2 and 3 toggling two times per dimension (using two decision boundaries) have medium reliability and soft bits index 4 and 5 toggling four times per dimension are the least reliable. The soft bit distribution in code blocks is the result of a bit recollection stage described in a 3GPP technical specification. The soft bits may be stored in a dedicated soft bit buffer or in any suitable computer readable memory.

SUMMARY

An objective of embodiments herein is therefore to improve performance in a communications network.

According to a first aspect, the objective is achieved by a method in a base station for transmitting a transport block to a user equipment in a communications network. The transport block comprises a plurality of bits. The base station receives information about a reception quality from the user equipment and selects a transport format based on the reception quality. Based on a decoding performance for the transport block, the base station dynamically selects a first redundancy version parameter for the reception quality. The base station transmits the transport block comprising the plurality of bits distributed according to the dynamically selected first redundancy version parameter and according to the selected transport format in a first transmission to the user equipment.

According to a second aspect, the objective is achieved by a base station for transmitting a transport block to a user equipment in a communications network. The transport block comprises a plurality of bits. The base station receives information about a reception quality from the user equipment. The base station comprises a selector which is configured to select a transport format based on the reception quality, and to dynamically select, for a first transmission, a first redundancy version parameter for the reception quality and based on a decoding performance for the transport block. The base station further comprises a transmitter which is configured to transmit the transport block comprising the plurality of bits distributed according to the dynamically selected first redundancy version parameter and according to the selected transport format in a first transmission to the user equipment.

Since the redundancy version parameter is dynamically selected based on the decoding performance for the transport block, the performance in the communications network is improved.

Embodiments herein afford many advantages, of which a non-exhaustive list of examples follows:

An advantage of the embodiments herein is that when each code block has a more even distribution of most reliable, medium reliable and least reliable soft bits, the probability of successful decoding of each code block is more equal.

A consequent advantage of the embodiments herein is that they provide improved downlink performance, particularly in QAM64. For a range of transport block sizes, the gains are in the order of 0.3-0.6 dB in the required Signal to Interference plus Noise Ratio (SINR) to obtain a throughput performance, depending on the redundancy version parameter originally used by the base station. If the most common RV=0 was used, then gains are possible for transport block sizes above 22000 bits and may be as high as 0.6-1 dB for some transport blocks. The average across all transport blocks is 0.3 dB.

It should be noted that QAM64 transport blocks with transport block sizes below 22000 are not scheduled anyway, because QAM16 has better performance in that region. Therefore the embodiments herein results in an advantage of a significant performance improvement of nearly all practical QAM64 transport blocks.

In QAM16, gains are generally smaller, e.g. around 0.1 dB, except for certain transport blocks having a size around 11000, where large gains of 0.6 dB are possible.

The transport block sizes referred to above are given assuming 15 codes. However, the advantage is similar with fewer codes.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The most and least reliable bit distribution across the code blocks is affected by the redundancy version parameter, which the base station has control over. The embodiments herein therefore relate to dynamically selecting the redundancy version parameter to achieve an even, or least uneven, reliability distribution of soft bits, depending on the chosen transport format. Since the dynamic selection of the redundancy version parameter will affect the receiver performance for that code block, in some embodiments, the base station also modifies a transport format look-up table to reflect the improvement coming from selecting the optimal redundancy version parameter. The choice of the redundancy version parameter may be used to optimize the Block Error Rate (BLER) performance for the transport block also during the first transmission, where the optimal value of the redundancy version parameter depends on the transport block. Dynamic selection is in this context related to that different redundancy version parameters may be selected during the first transmission, depending on the transport format selected, to achieve a more even reliability distribution of soft bits, and it is in contrast to a static selection where the same redundancy version parameter is used for all transmissions.

Figure 1:
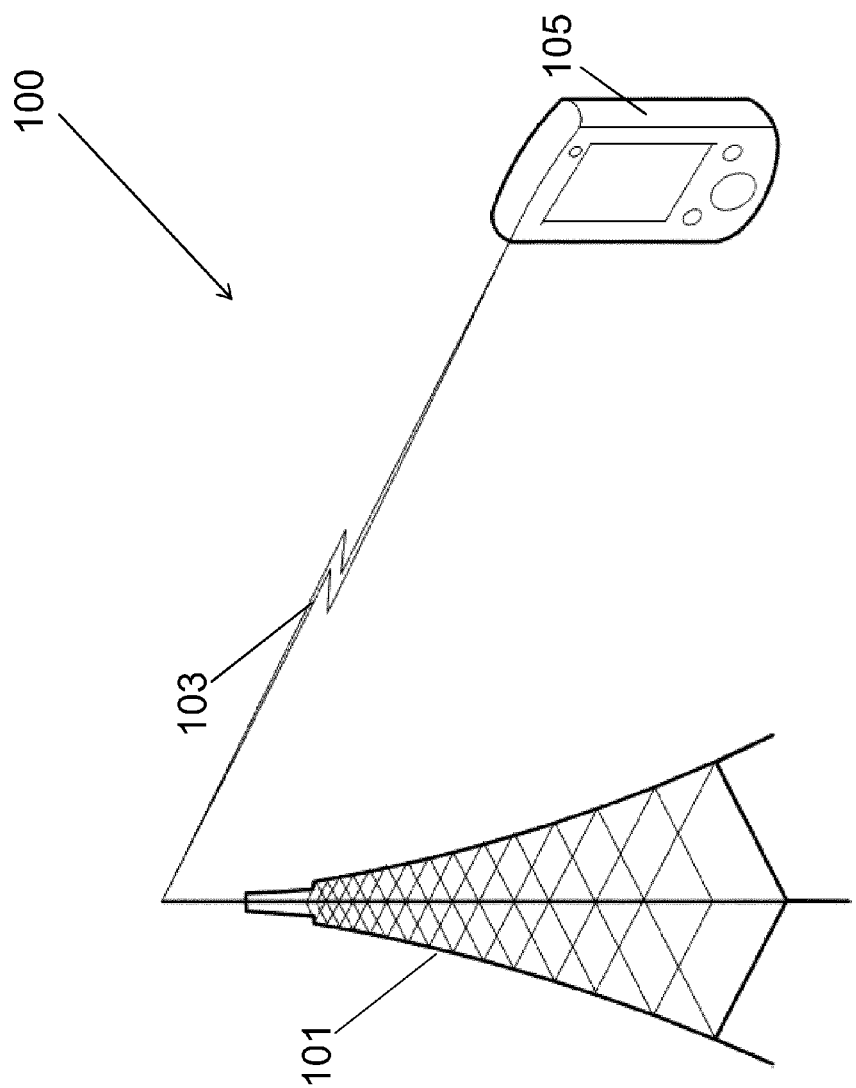
FIG. 1 is a schematic block diagram illustrating embodiments of a communications network.

FIG. 1 depicts a wireless communications network 100 in which embodiments herein may be implemented. The communications network 100 may in some embodiments apply to any suitable communication standards and using any suitable components. The communications standards may be one or more radio access technologies such as for example LTE, LTE Advanced, WCDMA, Global System for Mobile Communications (GSM), or any other 3GPP radio access technology.

The communications network 100 comprises a base station 101 which may be a NodeB, an eNodeB, or any other network unit capable to communicate over a radio channel 103 with a user equipment 105. The base station 101 comprises a scheduler configured to e.g. select the redundancy version parameter. The scheduler will be described in more detail in relation to FIG. 6 below.

The user equipment 105 may be any suitable communication device or computational device with communication capabilities capable to communicate with a base station over a radio channel, for instance but not limited to mobile phone, smart phone, Personal Digital Assistant (PDA), tablet computer, laptop, MP3 player or portable DVD player (or similar media content devices), digital camera, or even stationary devices such as a PC. A PC may also be connected via a mobile station as the end station of the broadcasted/multicasted media. The user equipment 105 may also be an embedded communication device in e.g. electronic photo frames, cardiac surveillance equipment, intrusion or other surveillance equipment, weather data monitoring systems, vehicle, car or transport communication equipment, etc. The user equipment 105 is referred to as UE in some of the figures.

The base station 101, according to the embodiments herein, would for a given transport block, dynamically select the redundancy version parameter that would result in the most advantageous soft bit reliability distribution for the given transport block length, code allocation, modulation, etc.

The example communications network 100 may further comprise any additional elements suitable to support communication between user equipment's 105 or between the user equipment 105 and another communication device, such as a landline telephone. The illustrated user equipment 105 may represent a communication device that comprises any suitable combination of hardware and/or software. Similarly, although the illustrated base station 101 may represent a base station that comprises any suitable combination of hardware and/or software, this base station may, in particular embodiments represent a base station such as the example base station 101 illustrated in greater detail by FIGS. 5-7.

WCDMA implements a soft bit collection procedure. The algorithm for selecting soft bits when partitioning a transport block into code blocks is defined by standards and it is not optimal. The bit collection procedure is embedded in the WCDMA standard, it cannot be changed. Ideally, each code block should have a similar proportion of most reliable, medium reliable and least reliable soft bits. This would make the probability of successful decoding of each code block equal. If some code blocks get a higher proportion of least reliable soft bits, they will much more likely fail decoding, and as a consequence, the whole transport block will fail a Cyclic Redundancy Check (CRC) check.

Unfortunately, the WCDMA HARQ algorithm, depending on the transport block size and coding rate, is not partitioning the most/least reliable soft bits evenly between code blocks. In certain cases, some received code blocks have up to 50% more least reliable soft bits than the most reliable ones. This problem is caused by the special systematic vs. parity bit collection procedure of a 3GPP specification. Such transport blocks suffer from degraded performance compared to the case where the soft bits would be distributed evenly in the code blocks of the transport block, and the performance degradation may be up to 1 dB.

Table 1 below presents the soft bit distribution within the individual code blocks in case of an example with HSDPA 15-code QAM64 transport block, where the total soft bit buffer comprises 43200 soft bits. 15-code refers to 15 parallel physical Spreading Factor (SF) SF16 spreading codes being used to transmit the transport block. Table 1 is for a redundancy version parameter RV=6. The redundancy version parameter will be described in more detail below. The top row comprises different transport block sizes. The left-most column comprises code blocks 1-9. As seen from table 1, between 6 and 9 number of code blocks are present for transport block sizes between 25000 and 42192. Difficult code blocks have a high percentage of least reliable soft bits and are marked using underline in table 1. Difficult code blocks are code blocks which have weaker BLER vs. SINR performance, i.e. they are less probable to decode successfully for given conditions. The easy code blocks have a high percentage of most reliable soft bits and are marked in italics in table 1. Code blocks marked in bold are the ones with approximately even distribution of reliable/unreliable soft bits. The number of most/medium/least reliable soft bits in each code block is shown in table 1.

Large variations of soft bit distributions are seen for most of the largest transport formats in table 1. For example when the transport block size is approx. 30000, it may be seen from table 1 that the first code block 1 is particularly bad, with a large number of least reliable soft bits, 2004, 2003 and 3193 of most, medium and least reliable soft bits, respectively. A bad code block is a code block that has higher probability of decoding failure. The remaining code blocks have a larger number of most reliable soft bits than least reliable ones. Since the BLER for the transport block is determined by its weakest code block, the uneven soft bit reliability distribution illustrated in table 1 leads to degraded BLER performance. BLER is defined as the ratio of the number of erroneous transport blocks received to the total number of transport blocks sent. An erroneous transport block is defined as a transport block, the CRC has failed.

TABLE 1

Distribution of soft bits within code blocks, 15-code QAM64, HSDPA, RV = 6

| | | trBLK: 25000 | 26000 | 30000 | 31000 | 34500 | 37000 | 38576 | 42192 |
|---|---|---|---|---|---|---|---|---|---|
| code block 1 | most | 2505 | 2172 | 2004 | 1775 | 1975 | 1544 | 1610 | 1566 |
| | mid | 2504 | 2170 | 2003 | 1774 | 1974 | 1544 | 1610 | 1565 |
| | least | 3631 | 2858 | 3193 | 2623 | 2223 | 2312 | 2180 | 1669 |
| code block 2 | most | 2505 | 2170 | 2380 | 1775 | 1975 | 1740 | 1610 | 1564 |
| | mid | 2629 | 2172 | 2381 | 1774 | 1974 | 1739 | 1610 | 1565 |
| | least | 3507 | 2858 | 2439 | 2622 | 2222 | 1921 | 2180 | 1672 |
| code block 3 | most | 2712 | 2172 | *2504* | 1978 | 1974 | 1852 | 1610 | 1566 |
| | mid | 3507 | 2170 | *2504* | 1980 | 1975 | 1853 | 1609 | 1565 |
| | least | 2420 | 2858 | *2192* | 2214 | 2223 | 1695 | 2181 | 1668 |
| code block 4 | most | *3339* | 2170 | *2504* | *2218* | 1974 | *1854* | *1844* | 1564 |
| | mid | *2880* | 3015 | *2504* | *2218* | 1975 | *1852* | *1845* | 1565 |
| | least | *2422* | 2015 | *2192* | *1735* | 2222 | *1694* | *1711* | 1672 |
| code block 5 | most | *3339* | *2822* | *2504* | *2218* | 1974 | *1852* | *1932* | 1566 |
| | mid | *2880* | *2473* | *2504* | *2218* | 1974 | *1854* | *1931* | 1565 |
| | least | *2420* | *1905* | *2192* | *1736* | 2224 | *1694* | *1537* | 1668 |
| code block 6 | most | | *2894* | *2504* | *2218* | 2060 | *1853* | *1932* | 1564 |
| | mid | | *2400* | *2504* | *2218* | 2060 | *1852* | *1931* | 1565 |
| | least | | *1906* | *2192* | *1735* | 2051 | 1695 | *1537* | 1672 |
| code block 7 | most | | | | *2218* | *2468* | 1853 | *1931* | 1566 |
| | mid | | | | *2218* | *2468* | 1853 | *1932* | 1565 |
| | least | | | | *1735* | *1235* | 1694 | *1537* | 1668 |
| code block 8 | most | | | | | | 1852 | *1931* | 1566 |
| | mid | | | | | | 1853 | *1932* | 1567 |
| | least | | | | | | 1695 | *1537* | 1668 |
| code block 9 | most | | | | | | | | *1878* |
| | mid | | | | | | | | *1878* |
| | least | | | | | | | | *1043* |

One configurable parameter in e.g. a scheduler of the base station 101 is the redundancy version parameter. The primary function of the redundancy version parameter is to govern handling of parity information in retransmissions and to provide suitable additional redundancy combinations. This is achieved e.g. by making sure that information previously sent at least reliable positions, will be retransmitted with higher reliability. Table 2 below illustrates the eight possible redundancy version parameters for 16QAM and 64QAM, for High Speed Shared Control CHannel: (HS-SCCH) type 1. Type 1, 2, and 3 refer to different operation modes in the networks, using different HS-SCCH formats.

TABLE 2

Redundancy version parameter

| RV | S | R | b |
|---|---|---|---|
| 0 | 1 | 0 | 0 |
| 1 | 0 | 0 | 0 |
| 2 | 1 | 1 | 1 |
| 3 | 0 | 1 | 1 |
| 4 | 1 | 0 | 1 |
| 5 | 1 | 0 | 2 |
| 6 | 1 | 0 | 3 |
| 7 | 1 | 1 | 0 |

The left-most column comprises the eight different values, 0-7, of the redundancy version parameter. The eight different values of redundancy version parameter controls three other parameters S, R and b, as illustrated in the middle left column, the middle right column and the right most column of table 2. The S parameter is used for allocating priority to either the systematic bits or the parity bits of a turbo code, the R parameter is used for puncturing and repetition and the b parameter is used for changing a position of constellation. As it may be seen from table 2, four different values of the b parameter are possible: 0, 1, 2, or 3.

In HS-SCCH type-1 scenarios, the redundancy version parameter for the first transmission is selectable. In HS-SCCH type-2 scenarios, the fixed RV=0 parameter is selected by the base station 101. In HS-SCCH type 3 scenarios, i.e. Multiple-Input and Multiple-Output (MIMO), it is again possible to select the redundancy version parameter. In state-of-the-art base stations, the same redundancy version parameter is always used during the first transmission, irrespective of the transport format. For example, most base stations vendors use RV=0. Therefore, the redundancy version parameter for the first transmission is traditionally considered to be a static parameter.

The effect of the b parameter for each of the redundancy version parameters 0-6 of one of the transport blocks, QAM64, 15 code, with transport block size (trBLK)=23808 is presented below in table 3. The transport block is divided into five code blocks 1-5, and some of them have a particularly high proportion of least reliable soft bits, marked with underline or underline combined with italics, depending on severity, as above. It may be seen from table 3 that for RV=0, 1 or 6, the first code block 1 will be the most difficult to decode because it has >2*1900 least reliable soft bits. For other values of the redundancy version parameter, code blocks 3, 4, also appear difficult. Although in case of RV=5, the higher number of least significant soft bits is alleviated by the higher number of most reliable ones, marked with italics. Therefore, redundancy version parameter 5 is expected to perform best.

TABLE 3

Transport block QAM64, 15 codes, size = 23808

| | RV: | | | | | | | |
|---|---|---|---|---|---|---|---|---|
| | 0 | 1 | 2 | 3 | 4 | 5 | 6 | |
| | | | | "b": | | | | |
| | 0 | 0 | 1 | 1 | 1 | 2 | 3 | |
| code block nr. 1 | 1200 | 1200 | 1949 | 1949 | 1949 | 1200 | 1200 | most-reliable X |
| | 1186 | 1186 | 1920 | 1920 | 1920 | 1185 | 1186 | most-reliable Y |
| | 1200 | 1200 | 1200 | 1200 | 1200 | 1949 | 1200 | mid-reliable X |
| | 1185 | 1185 | 1185 | 1185 | 1185 | 1920 | 1185 | mid-reliable Y |
| | *1949* | *1949* | 1200 | 1200 | 1200 | 1200 | *1949* | least-reliable X |
| | *1920* | *1920* | 1186 | 1186 | 1186 | 1186 | *1920* | least-reliable Y |
| code block nr. 2 | 1230 | 1230 | 1383 | 1383 | 1383 | 1682 | 1230 | most-reliable X |
| | 1242 | 1242 | 1410 | 1410 | 1410 | 1694 | 1242 | most-reliable Y |
| | 1682 | 1682 | 1682 | 1682 | 1682 | 1383 | 1682 | mid-reliable X |
| | 1694 | 1694 | 1694 | 1694 | 1694 | 1410 | 1694 | mid-reliable Y |
| | 1383 | 1383 | 1230 | 1230 | 1230 | 1230 | 1383 | least-reliable X |
| | 1410 | 1410 | 1242 | 1242 | 1242 | 1242 | 1410 | least-reliable Y |
| code block nr. 3 | 1590 | 1590 | 1289 | 1289 | 1289 | *1439* | 1590 | most-reliable X |
| | 1591 | 1591 | 1290 | 1290 | 1290 | *1440* | 1591 | most-reliable Y |
| | 1439 | 1439 | 1439 | 1439 | 1439 | 1289 | 1439 | mid-reliable X |
| | 1440 | 1440 | 1440 | 1440 | 1440 | 1290 | 1440 | mid-reliable Y |
| | 1289 | 1289 | *1590* | *1590* | *1590* | *1590* | 1289 | least-reliable X |
| | 1290 | 1290 | *1591* | *1591* | *1591* | *1591* | 1290 | least-reliable Y |
| code block nr. 4 | 1590 | 1590 | 1290 | 1290 | 1290 | *1440* | 1590 | most-reliable X |
| | 1591 | 1591 | 1290 | 1290 | 1290 | *1440* | 1591 | most-reliable Y |
| | 1440 | 1440 | 1440 | 1440 | 1440 | 1290 | 1440 | mid-reliable X |
| | 1440 | 1440 | 1440 | 1440 | 1440 | 1290 | 1440 | mid-reliable Y |
| | 1290 | 1290 | *1590* | *1590* | *1590* | *1590* | 1290 | least-reliable X |
| | 1290 | 1290 | *1591* | *1591* | *1591* | *1591* | 1290 | least-reliable Y |
| code block nr. 5 | 1590 | 1590 | 1289 | 1289 | 1289 | *1439* | 1590 | most-reliable X |
| | 1590 | 1590 | 1290 | 1290 | 1290 | *1441* | 1590 | most-reliable Y |
| | 1439 | 1439 | 1439 | 1439 | 1439 | 1289 | 1439 | mid-reliable X |
| | 1441 | 1441 | 1441 | 1441 | 1441 | 1290 | 1441 | mid-reliable Y |
| | 1289 | 1289 | *1590* | *1590* | *1590* | *1590* | 1289 | least-reliable X |
| | 1290 | 1290 | *1590* | *1590* | *1590* | *1590* | 1290 | least-reliable Y |

The uneven soft bit reliability distribution leads to degraded BLER performance. The soft bit reliability distribution, and in particular its unevenness, depends on the b parameter in the redundancy version parameter setting.

Figures 2A, 2B:
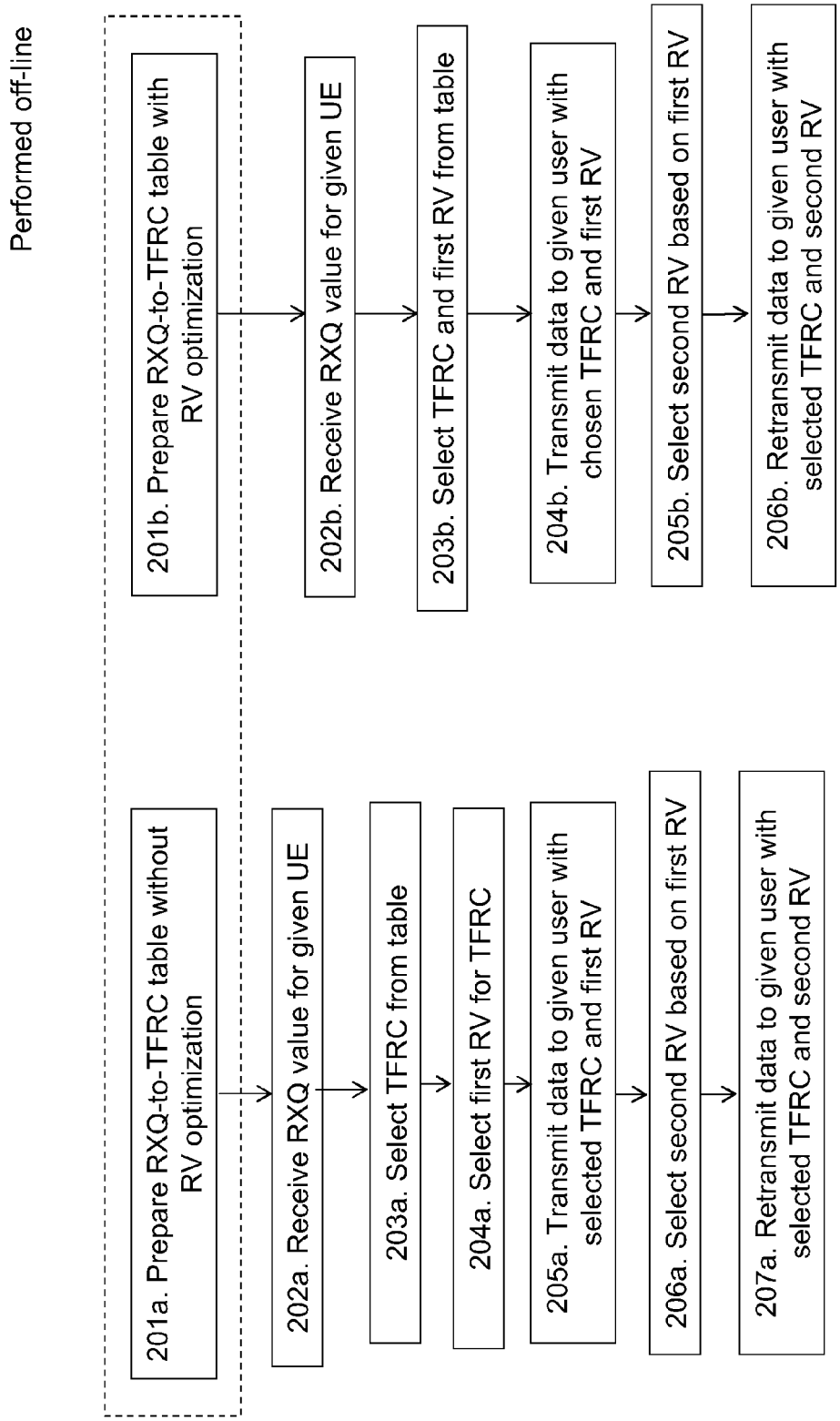
FIG. 2a and b are flow charts illustrating embodiments of a method.

The method for transmitting a transport block in a communications network, according to some embodiments will now be described with reference to the flowcharts depicted in FIGS. 2a and 2b. The difference between FIG. 2a and FIG. 2b is that the redundancy version parameter selection is applied without transport format lookup table optimization (e.g. a table designed for state-of-the-art operation with a fixed first redundancy version parameter setting is used) in FIG. 2a, while the lookup table in FIG. 2b is created considering the redundancy version parameter optimization. The method illustrated in FIG. 2a comprises the following steps, which steps may as well be carried out in another suitable order than described below:

Step 201a

The base station 101 prepares information about Reception Quality (RXQ) at the user equipment 105 and the Transport Format Resource Combination (TFRC), e.g. a RXQ-to-TFRC table. The RXQ-to-TFRC table may be a Look-Up Table (LUT). In other embodiments, a function may be used instead of a table to map the reception quality to the transport format. However, the RXQ-to-TFRC table is used in the following as an example. The RXQ-to-TFRC table comprises information about possible combinations of reception quality and transport format, without any optimization with regards to the redundancy version parameter. The reception quality is the observed received signal quality at the user equipment 105. The table is stored in a computer readable memory of the base station 101. An example of the table is shown below in table 4, where the left column comprises the reception quality and the right column comprises the transport format.

TABLE 4

| RXQ | TFRC |
|---|---|
| RXQ1 | TFRC1 |
| RXQ2 | TFRC2 |
| RXQ3 | TFRC3 |
| RXQ4 | TFRC4 |

This step is advantageously performed off-line at some time before performing step 202a, for example by performing numerical simulations and using the results to determine the base station 101 scheduler configuration.

Step 202a

The base station 101 receives information about the reception quality from the user equipment 105. The reception quality may be in the form of e.g. a Channel Quality Indicator (CQI), or a further processed (filtered and/or offset) function of it, which represents a measure of the channel quality of the radio channel 103 between the base station 101 and the user equipment 105. The CQI value may reflect the symbol SINR after equalization and is a number between 1 and 30, with 1 or 2 dB receive quality difference between the steps. Using table 4 above as an example, the reception quality RXQ2 may be received.

The base station 101 may receive the CQI report at regular intervals from the user equipment 105, e.g. every 2 ms.

The received value of the reception quality may be stored in a computer readable memory comprised in the base station 101. In some embodiments, the base station 101 may store only one single reception quality value at a time. In another embodiment, the base station 101 may store a plurality of reception quality values in the form of a table in the memory.

Step 203a

The base station 101 selects a transport format for the received reception quality from the table created in step 201a. In the RXQ-to-TFRC table, the received reception quality information from the given user equipment 105 is mapped to the transport format to be used, assuming a fixed redundancy version parameter for all transport block sizes. Continuing with the example from step 202a where the reception quality RXQ2 was received and then the base station 101 selects the transport format TRFC2.

The transport format is typically selected based on off-line simulation results, to maintain a chosen target BLER at the first transmission. In such embodiment, as illustrated in FIG. 2a, the average throughput will be increased by lowering the first transmission BLER for QAM transmissions in certain transport block size ranges.

By selecting the transport format from the table without redundancy version optimization, a slightly sub-optimal transport format may be selected. For example, TFRC having a size of 24000 may be chosen rather than TFRC of 24200 size, because for the default redundancy version parameter, the second one may have a reception quality which exceeds the current RXQ.

Step 204a

The base station 101 dynamically selects a first redundancy version parameter which is optimal for the selected transport format and based on the decoding performance of the transport block. The first redundancy version parameter is for a first transmission of the data to the user equipment 105. The first redundancy version parameter is dynamically selected from a table comprising information about an optimal first redundancy version parameter for each transport format of a plurality of transport formats. An example of this table is shown in table 5 below, where the left column comprises the transport format and the right column comprises the first redundancy version parameter.

TABLE 5

| TFRC | RV |
|---|---|
| TFRC1 | 1 |
| TFRC2 | 1 |
| TFRC3 | 2 |
| TFRC3 | 3 |
| TFRC4 | 4 |

In step 203a, the transport format TFRC2 was selected as an example. From table 5 it is seen that the first redundancy version parameter RV=1 is selected for TFRC2.

Figure 3:
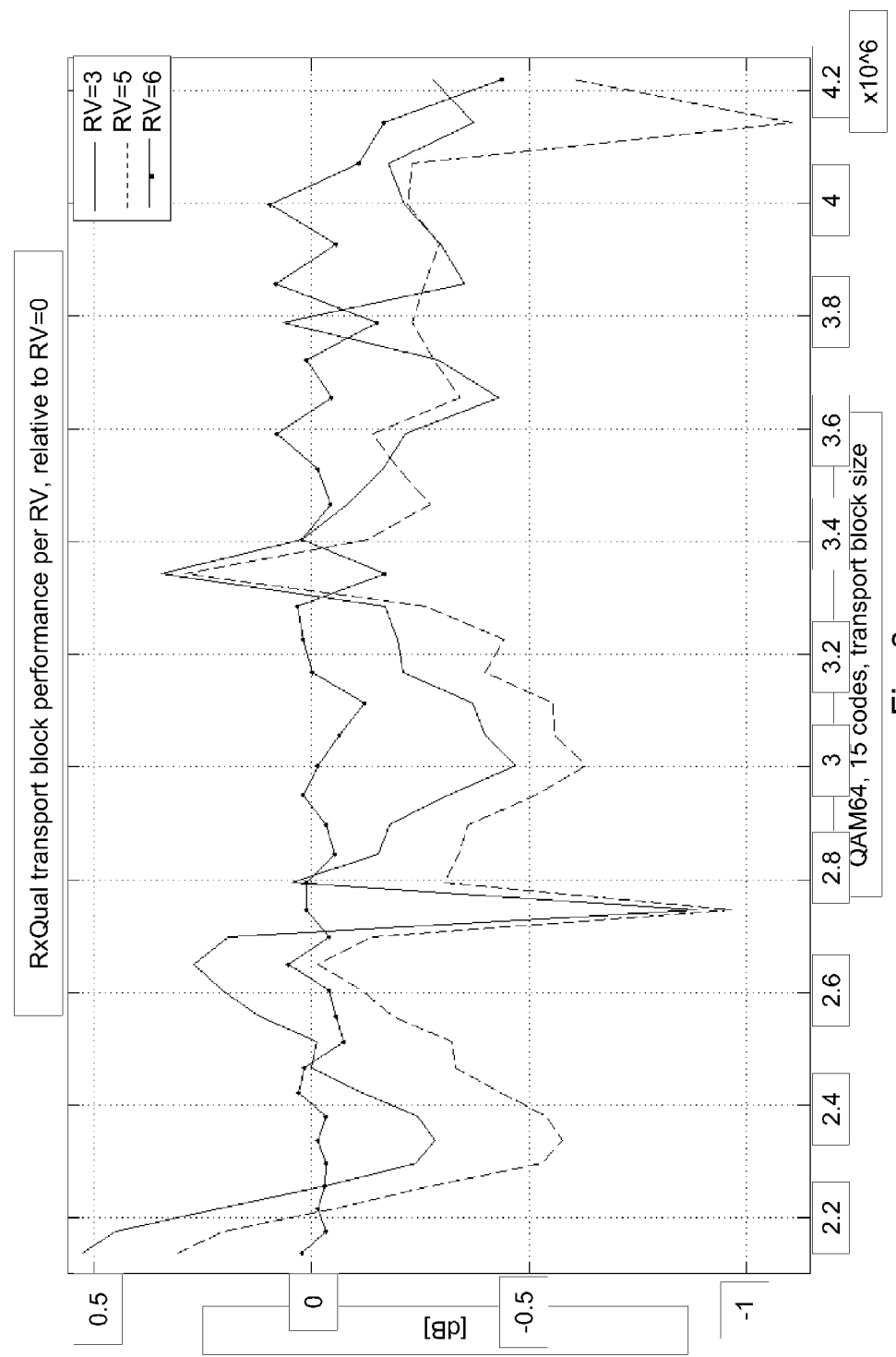
FIG. 3 is a graph illustrating simulations of different redundancy version parameters.

FIG. 3 is a graph illustrating a simulation of relative transport block performance depending on the dynamically selected redundancy version parameter in the first transmission. The y-axis of FIG. 3 is measured in decibel and represents the difference in the received own-cell signal power to interference power ratio, i.e. Ior/Ioc, required to reach 10% BLER, compared to that required by RV=0. The x-axis of FIG. 3 is the transport block size. The continuous line illustrates RV=3, the dashed line illustrates RV=5 and the dotted continuous line illustrates RV=6. Note that only these three selected redundancy version parameters were simulated. Please note further that the performance of some redundancy version parameters is very similar. For example, RV=0 performs similarly as RV=1, RV=6 and RV=7. RV=2 performs similarly as RV=3 and RV=4. RV=5 is unique. RV=5 is unique because it is the only redundancy version parameter which has the "b" parameter equal to 2 in table 2. The parameter b affects the percentage of most and least reliable bits within code blocks. The lower values indicate better performance. The reference level 0 dB thus corresponds to RV=0 and lines dropping below 0 dB indicate performance improvement potential. Another reason for relative performance difference between redundancy version parameters is the percentage of systematic/parity bits selected. It may also be seen from FIG. 3 that the relative performance varies depending on the transport block size. Differences between the worst and the best redundancy version parameter may be as large as 0.5-1 dB. It should be noted that relative differences between transport blocks are not a consequence of the user equipment receiver's design.

In QAM16 there are no medium reliable soft bits, since only two bits are transmitted in each of I and Q dimension. Depending on the user equipment category, the soft bit buffer size may be either 28800 or 43200, which also affects soft bit distribution. The relative differences between redundancy version parameters are smaller in QAM16 than QAM64, but nevertheless present.

In one embodiment, "optimal" means achieving the lowest possible BLER. As an example, based on the simulation results in FIG. 3, the base station 101 would select RV=0 for transport block sizes below 22000 bits and RV=5 for larger transport block sizes, except for certain transport block sizes where RV=6 or RV=3 provide further improvements. Note that FIG. 3 is just an example. In practice, simulations at higher resolution and for all transport block combinations would be performed.

In another embodiment, "optimal" means avoiding an uneven reliability distribution. Using Table 3 as an example, the columns would be compared and the redundancy version parameter that has least underlined entries in any code block or where the number of high reliability and low reliability soft bits is balanced is selected. RV=5 would be selected in that example. In addition, the ratio of systematic and parity bits included under each redundancy version parameter may be considered as a differentiating factor when dynamically selecting the optimal redundancy version parameter.

Returning to FIG. 2a.

Step 205a

The base station 101 transmits data to the given user equipment 105 according to the selected transport format and the dynamically selected first redundancy version parameter, e.g. TFRC2 and RV=1. The transmission is the first transmission.

Step 206a

The base station 101 dynamically selects an optimal second redundancy version parameter for the selected transport format and further based on the first redundancy version parameter. This is done in case a retransmission of the data needs to be done, i.e. when the data transmitted in step 205a was not successfully decoded by the user equipment 105. The reason for unsuccessful decoding may be for example changes in the channel and the interference background, CQI estimation errors etc. The base station 101 performs this step when it has not received any ACK from the user equipment 105 within a predefined period of time after the data was transmitted for the first time in step 205a.

Step 207a

The base station 101 retransmits data to the given user equipment 105 according to the selected transport format and the dynamically selected second redundancy version parameter. During retransmission, most/mid/least reliable soft bit positions tend to be reversed compared to the first transmission, and then added to original soft bits from the first transmission. Also, retransmission schemes tend to retransmit least reliable soft bits at most reliable positions, thereby reducing loss from uneven distribution within the code block.

A method for transmitting a transport block in a communications network, according to some embodiments will now be described with reference to the flowchart depicted in FIG. 2b. The method comprises the following steps, which steps may as well be carried out in another suitable order than described below.

Step 201b

The base station 101 prepares a table comprising information about reception quality at the user equipment 105 and about transport format i.e. a RXQ-to-TFRC table. The RXQ-to-TFRC table may be a LUT. The RXQ-to-TFRC table comprises information about possible combinations of reception quality and transport format, with optimization with regards to the redundancy version parameter. This step is performed off-line at some time before performing step 202b, for example directly before performing step 202b or a long time before performing step 202b.

In some embodiments, the look-up table is built by comparing the BLER performance of all redundancy version parameter options for all allowed transport block sizes. For each transport format, the best performing redundancy version parameter and its reception quality are stored and the look-up table is built from these entries. In another embodiment, a block size-dependent offset is added to the reception quality value used as the argument into the standard lookup table, which is designed for a fixed first-transmission redundancy version parameter. Such an embodiment increases the average throughput by scheduling higher-rate transmissions while maintaining the target BLER.

The table may be based on off-line simulation results. The simulations may be performed by the base station vendor and stored in a memory in the base station 101 as pre-configured data.

An example of the table is shown below in Table 6, where the left column comprises the reception quality, the middle column comprises the transport format and the right column comprises the first redundancy version parameter.

TABLE 6

| RXQ | TFRC | RV |
| --- | --- | --- |
| RXQ1 | TFRC1 | RV = 1 |
| RXQ2 | TFRC2 | RV = 2 |
| RXQ3 | TFRC3 | RV = 5 |
| RXQ4 | TFRC4 | RV = 6 |

Step 202*b*

This step corresponds to step 202*a* in FIG. 2*a*. The base station 101 receives the reception quality from the user equipment 105, for example RXQ4. The reception quality may be in the form of the CQI which represents a measure of the channel quality of the radio channel 103 between the base station 101 and the user equipment 105.

The base station 101 may receive the value of the reception quality at regular intervals from the user equipment 105, e.g. every 2 ms.

The received value of the reception quality may be stored in a computer readable memory comprised in the base station 101. In some embodiments, the base station 101 may store only one single reception quality value at a time. In another embodiment, the base station 101 may store a plurality of reception quality values in the form of a table in the memory.

Step 203*b*

The base station 101 selects a transport format and a first redundancy version parameter for the received reception quality using for example the table created in step 201*b*. In the RXQ-to-TFRC table, the received reception quality information, e.g. CQI information, from the user equipment 105 is mapped to the transport format to be used.

In the example where the received reception quality was RXQ4, then the transport format TRFC4 and the first redundancy version parameter RV=6 is selected using table 6.

Step 204*b*

This step corresponds to step 205*a* in FIG. 2*a*. The base station 101 transmits data to the given user equipment according to the selected transport format and the first redundancy version parameter, e.g. TRFC4 and RV=6. The transmission is the first transmission Step 205*b*

The base station 101 dynamically selects an optimal second redundancy version parameter for the selected transport format and further based on the first redundancy version parameter. This is done in case a retransmission of the data needs to be done, i.e. when the data transmitted in step 204*b* was not successfully decoded by the user equipment 105. As mentioned above, the reason for the unsuccessful decoding may be an uneven distribution of the soft bits in the code blocks. The base station 101 performs this step when it has not received any ACK from the user equipment 105 within a predefined period of time after the data was transmitted for the first time in step 204*b*.

Step 206*b*

The base station 101 retransmits data to the given user equipment 105 according to the selected transport format and the dynamically selected second redundancy version parameter. During retransmission, most/mid/least reliable soft bit positions tend to be reversed compared to the first transmission, and then added to original soft bits from the first transmission. Also, retransmission schemes tend to retransmit least reliable soft bits at most reliable positions, thereby reducing loss from uneven distribution within the code block.

Figure 4:
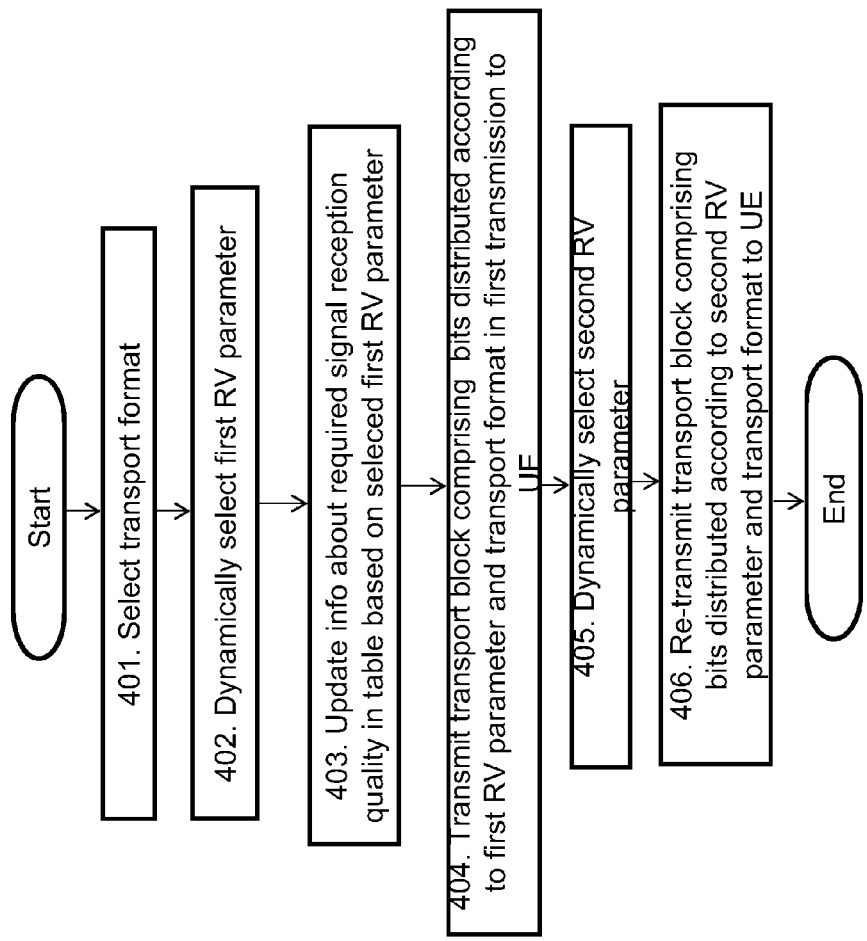
FIG. 4 is a flow chart illustrating embodiments of a method in a base station.

The method described above will now be described seen from the perspective of the base station 101. FIG. 4 is a flowchart describing the present method in the base station 101, for transmitting the transport block to the user equipment 105 in a communications network 100. As mentioned above, the transport block comprises a plurality of bits. The method comprises the following steps to be performed by base station 101, which steps may be performed in any suitable order:

Step 401

This step corresponds to step 203*a* in FIG. 2*a* and step 203*b* in FIG. 2*b*. The base station 101 selects a transport format for use in the downlink transmission to the user equipment 105.

In some embodiments, the transport format is selected from a table comprising information about reception quality at the user equipment 105 for each transport format of a plurality of transport formats. This table is not optimized with regards to the redundancy version parameter. An example of this table is seen in table 4 in relation to step 201*a* in FIG. 2*a* above.

In some embodiments, the transport format is selected from a table comprising information about reception quality at the user equipment 105 for each transport format of a plurality of transport formats and for each first redundancy version parameter of a plurality of first redundancy version parameters. In other words, the table is optimized with regards to the redundancy version parameter. The table is stored in a computer readable memory of the base station 101. An example of this table is seen in table 6 in relation to step 201*b* in FIG. 2*b* above.

In some embodiments, the transport format is a HSDPA transport format.

Step 402

This step corresponds to step 204*a* in FIG. 2*a* and step 203*b* in FIG. 2*b*. The base station 101 dynamically selects the first redundancy version parameter based on the decoding performance of the user equipment 101 for the transport block. The first redundancy version parameter may be 0-7, as presented in table 2 above. The selection of the redundancy version parameter affects how most and least reliable bits are distributed in code blocks. The redundancy version parameter is therefore selected in order to maximize the system throughput in each retransmission.

In some embodiments, the transport format and the first redundancy version parameter are selected jointly from a table comprising information about required reception quality at the user equipment 105 for each transport format and first redundancy version parameter combination of a plurality of transport format and first redundancy version parameter combinations. The table may also be seen as comprising information about preferred transport format and first redundancy version parameter combination for the observed signal reception quality at the user equipment 105. The table is stored in a computer readable memory of the base station 101. An example of this table is seen in table 6 in relation to step 201b in FIG. 2b above. The required signal reception quality is the signal quality to achieve a required reception performance. The signal quality should be such that certain criteria are satisfied. The criteria may be for example 10% BLER at the receiver.

In some embodiments, the first redundancy version parameter is dynamically selected from a table comprising information about an optimal first redundancy version parameter for each transport format of a plurality of transport formats. The table is stored in a computer readable memory of the base station 101. An example of this table is seen in table 6 in relation to step 204a in FIG. 2a above.

In some embodiments, the decoding performance is associated with at least one of the BLER, a reliability distribution of the plurality of bits in at least one code block, and a distribution of systematic bits and parity bits in the at least one code block.

Step 403

In some embodiments, based on the dynamically selected first redundancy version parameter, the base station 101 updates the information about reception quality in the table comprising information about reception quality at the user equipment 105, e.g. updating tables 5 or 6. The updating of the table may also be referred to as optimizing the table. By default, the table comprises reception quality metrics calculated for e.g. RV=0. After updating according to the first redundancy version parameter for the transport format, the table comprises information about transport formats for RV=5, RV=0 and for RV=3.

Step 404

This step corresponds to step 205a in FIG. 2a and step 204b in FIG. 2b. The base station 101 transmits the transport block comprising the plurality of bits distributed according to the dynamically selected first redundancy version parameter and according to the selected transport format in a first transmission to the user equipment 105.

In some embodiments, the plurality bits in the transport block distributed according to the dynamically selected first redundancy version parameter are mapped to QAM symbols.

As mentioned above, at the first transmission, the transport format and the first redundancy version parameter are selected jointly or sequentially.

Step 405

This step corresponds to step 206a in FIG. 2a and step 205b in FIG. 2b. The base station 101 dynamically selects a second redundancy version parameter based on the first redundancy version parameter.

In some typical embodiments, the first redundancy version parameter is different from the second redundancy version parameter.

Some redundancy version parameters cannot be used one after another. For example RV=1 should not be used after RV=0 because in retransmission, most/least reliable bits need to be send in reversed order with respect to the first transmission, in order to achieve the best performance. Only certain patterns of redundancy version parameters may be used to achieve that. Depending on the first redundancy version parameter, the base station may use different patterns, for example "0 5 2 6", "5 0 6 2", "6 2 5 0" etc.

Step 406

This step corresponds to step 207a in FIG. 2a and step 206b in FIG. 2b. The base station 101 retransmits the transport block comprising the plurality of bits distributed according to the dynamically selected second redundancy version parameter and according to the selected transport format to the user equipment 105.

The plurality of bits in the transport block distributed according to the dynamically selected first redundancy version parameter is mapped to QAM symbols.

As mentioned above, at retransmission, it is only the second redundancy version which is selected. The transport format remains the same. Typically, the second redundancy version parameter is picked from a fixed sequence [RV2, . . . , RVn, . . . RVN]=F(RV1). Where n>1 and is a positive integer and where N is a positive integer.

Figure 5:
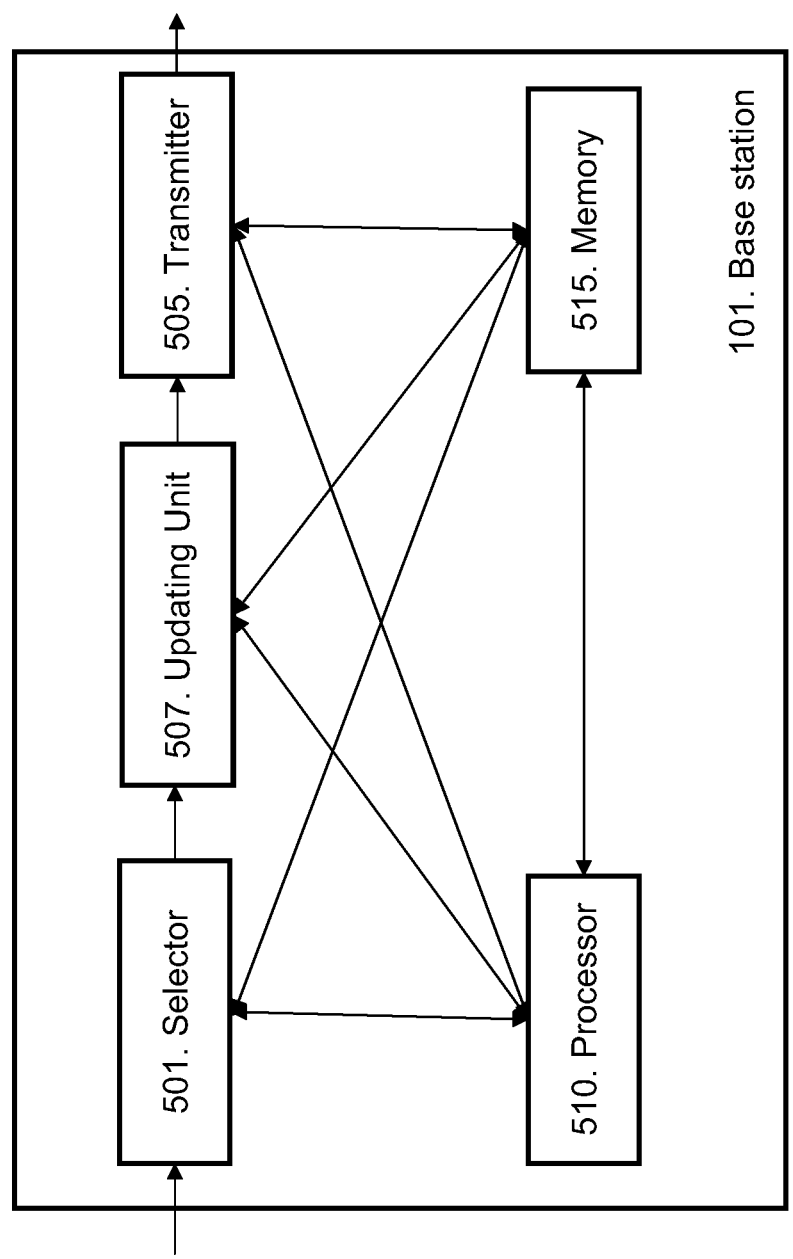
FIG. 5 is a schematic block diagram illustrating embodiments of a base station.

To perform the method steps shown in FIG. 4 for transmitting a transport block to the user equipment 105 in a communications network 100 the base station 101 comprises an arrangement as shown in FIG. 5. The transport block comprises a plurality of bits. In some embodiments, the plurality bits in the transport block distributed according to the dynamically selected first redundancy version parameter are mapped to QAM symbols.

The base station 101 comprises a selector 501 configured to select the transport format and to dynamically select the first redundancy version parameter based on the decoding performance for the transport block. In some embodiments, the first redundancy version parameter is dynamically selected from a table comprising information about an optimal first redundancy version parameter for each transport format of a plurality of transport formats. In some embodiments, the transport format is a HSPA DL transport format. In some embodiments, the decoding performance is associated with at least one of the BLER, a reliability distribution of the plurality of bits in at least one code block, and a distribution of systematic bits and parity bits in the at least one code block.

In some embodiments, the selector 501 is further configured to dynamically select a second redundancy version parameter based on the first redundancy version parameter. In some embodiments, the first redundancy version parameter is different from the second redundancy version parameter. In some embodiments, the first redundancy version parameter is the same as the second redundancy version parameter.

In some embodiments, the transport format and the first redundancy version parameter are selected jointly from a table comprising information about reception quality at the user equipment 105 for each transport format and first redundancy version parameter combination of a plurality of transport format and first redundancy version parameter combinations.

In some embodiments, the transport format is selected from a table comprising information about reception quality at the user equipment 105 for each transport format of a plurality of transport formats.

In some embodiments, the transport format is selected from a table comprising information about reception quality at the user equipment 105 for each transport format of a plurality of transport formats and for each first redundancy version parameter of a plurality of first redundancy version parameters.

The base station 101 further comprises a transmitter 505 configured to transmit the transport block comprising the plurality of bits distributed according to the dynamically selected first redundancy version parameter and according to the selected transport format in a first transmission to the user equipment 105. In some embodiments, the transmitter 505 is further configured to retransmit the transport block comprising the plurality of bits distributed according to the dynamically selected second redundancy version parameter and according to the selected transport format to the user equipment 105.

In some embodiments, the base station 101 further comprises an updating unit 507 configured to, based on the dynamically selected first redundancy version parameter, update the information about reception quality in the table comprising information about reception quality at the user equipment 105.

The present mechanism for transmitting the transport block to the user equipment 105 in a communications network 100 may be implemented through one or more processors, such as a processor circuit 510 in the base station arrangement depicted in FIG. 5, together with computer program code and instructions stored in a memory 515 for performing the functions of the embodiments herein. The processor circuit 510 may include Radio Frequency (RF) circuitry and baseband processing circuitry (not shown). The processor may be for example a Digital Signal Processor (DSP), Application Specific Integrated Circuit (ASIC), Field-programmable gate array (FPGA) processor or microprocessor. One or more of the blocks of FIGS. 6 and 7 may be implemented on a processor shared with other functional components of a base station 101. Alternatively, several of the blocks discussed above may be provided through the use of dedicated hardware, while others are provided with hardware for executing software, in association with the appropriate software or firmware. The term "processor circuit" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. The program code mentioned above may also be provided as a computer program product, for instance in the form of a data carrier carrying computer program code for performing the embodiments herein when being loaded into the base station 101. One such carrier may be in the form of a CD ROM disc. It is however feasible with other data carriers such as a memory stick. The computer program code may furthermore be provided as pure program code on a server and downloaded to the base station 101.

The memory 515 may comprise one or more memory units. The memory 515 is arranged to be used to store data, redundancy version parameters, RXQ-TFRC tables, received data streams, power level measurements, threshold values, time periods, configurations, computer program code, instructions, scheduling, and applications to perform the methods herein when being executed in the base station 101.

Those skilled in the art will also appreciate that the selector 501, the transmitter 505 and the updating unit 507 described above may refer to a combination of analog and digital circuits, and/or one or more processors configured with software and/or firmware, e.g. stored in a memory, that when executed by the one or more processors such as the processor 510 perform as described above. One or more of these processors, as well as the other digital hardware, may be comprised in a single ASIC, or several processors and various digital hardware may be distributed among several separate components, whether individually packaged or assembled into a System-on-a-Chip (SoC).

Figure 6:
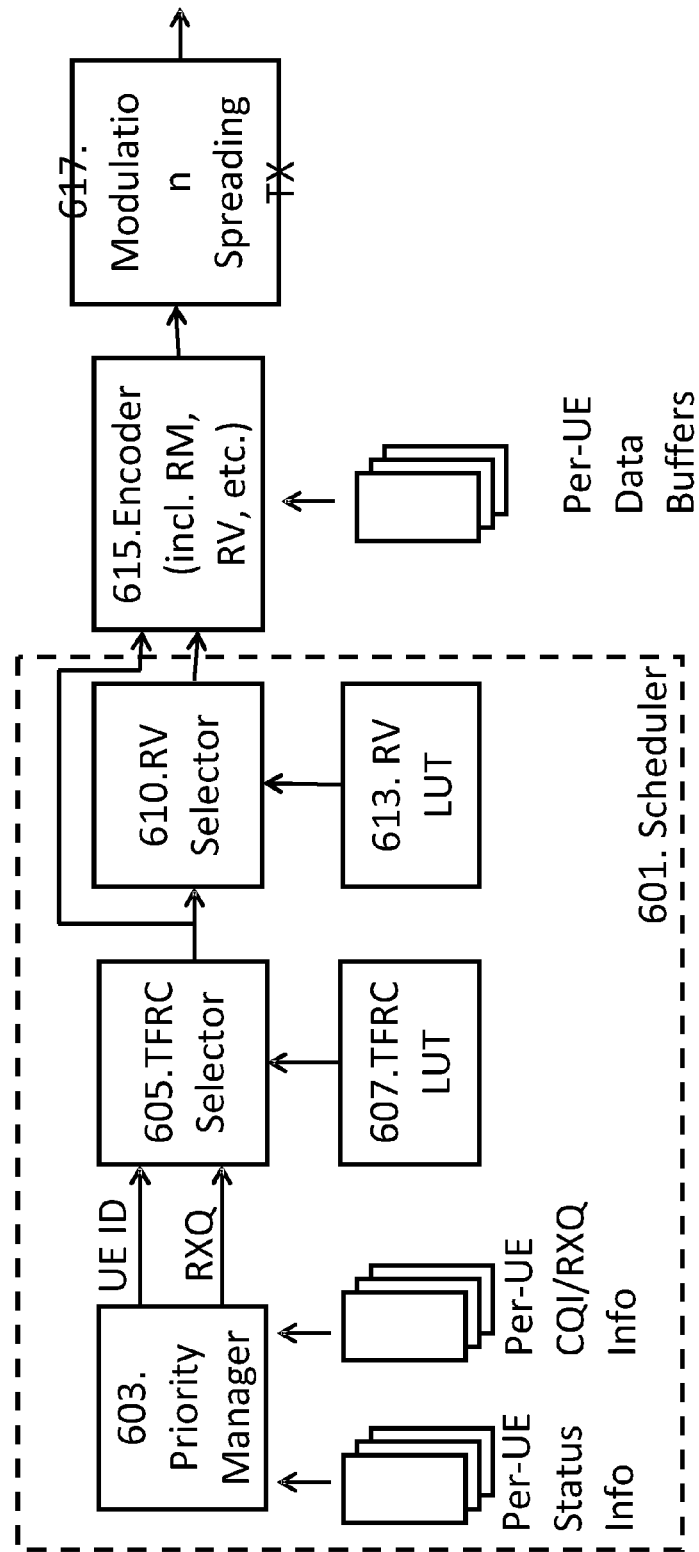
FIG. 6 is a schematic block diagram illustrating embodiments of a base station.

FIG. 6 illustrates more details of an example of a base station arrangement. The base station 101 comprises a scheduler 601. The scheduler 601 comprises a priority manager 603. The priority manager 603 is connected to memory units comprising status information per user equipment, e.g. data buffer status and recent scheduling history, and comprising information about CQI/RXQ per user equipment. The information may be stored in the form of e.g. a table. This is the information received described in relation to step 202a and step 202b above. The priority manager 603 transmits information about the user equipment 105 identity (UE ID) of the scheduled the user equipment and the reception quality for the user equipment 105 to a TFRC Selector 605. The TFRC Selector 605 selects the transport format for the reception quality for the user equipment 105. The TFRC Selector 605 selects the transport format from a TFRC LUT 607. The scheduler 601 further comprises a RV Selector 610. Based on the selected transport format from the TFRC Selector 605, the RV Selector 601 selects a redundancy version parameter, first and/or second redundancy version parameter, from a RV LUT 613. The selected transport format and the selected redundancy version parameter are transmitted to an encoder 615. The encoder 615 encodes the transport block according to the transport format, Rate Matching (RM) and the selected redundancy version parameter. The encoder 615 obtains information bits to be encoded from the data buffer of the scheduled user equipment 105. The output of the encoder 615 is provided to a modulation spreading TX 617 unit which modulates the transport block using a modulation technique such as e.g. QAM 16 or QAM 64 before transmitting it to the user equipment 105. The modulation spreading TX 617 corresponds to the transmitter 505 in FIG. 5.

Figure 7:
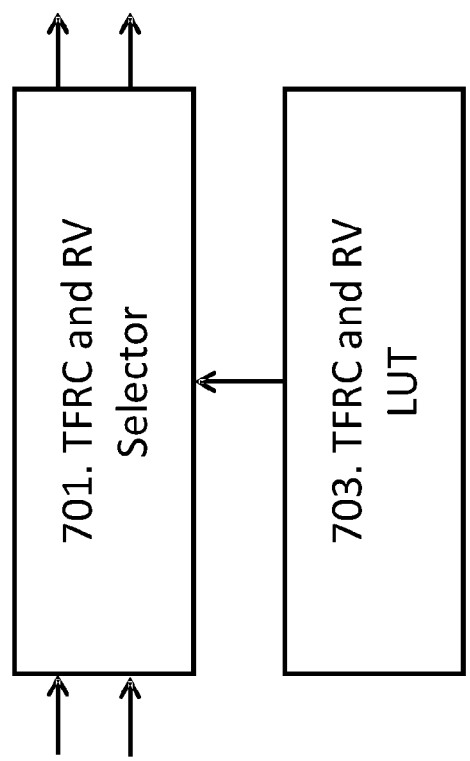
FIG. 7 is a schematic block diagram illustrating embodiments of a base station.

FIG. 7 is a schematic block diagram illustrating that the TFRC Selector 605 and the RV selector 610 may be implemented as one unit referred to as TFRC and RV Selector 701 in FIG. 7. This is the same as the selector 501 illustrated in FIG. 5. Furthermore, the TFRC LUT 607 and the RV LUT 607 in FIG. 6 may also be one table, illustrated as the TFRC and RV LUT 703 in FIG. 7. The selector 701 uses the contents of LUT 703 to carry out the TFRV and RV selection.

Alternative embodiments of the base station 101 may comprise additional components responsible for providing additional functionality, comprising any of the functionality identified above and/or any functionality necessary to support the embodiments described above.

The embodiments herein are not limited to the above described preferred embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method, in a base station, for transmitting a transport block to a user equipment in a communications network, the transport block comprising a plurality of bits, the method comprising:
receiving information about a reception quality from the user equipment;

selecting a transport format based on the reception quality;
dynamically selecting, for a first transmission, a first redundancy version parameter based on the selected transport format for the transport block;
transmitting, in a first transmission, to the user equipment the transport block with the plurality of bits distributed according to the selected first redundancy version parameter and according to the selected transport format,
wherein the transport format and the first redundancy version parameter are selected jointly from a table comprising information about required signal reception quality at the user equipment for each combination of transport format and first redundancy version parameter of a plurality of transport format and first redundancy version parameter combinations.

2. The method of claim 1, further comprising:
selecting a second redundancy version parameter based on the first redundancy version parameter; and
retransmitting, to the user equipment, the transport block with the plurality of bits distributed according to the selected second redundancy version parameter and according to the selected transport format.

3. The method of claim 1, further comprising updating, based on the selected first redundancy version parameter, the information about required signal reception quality in the table.

4. The method of claim 1, wherein the table comprises information about an optimal first redundancy version parameter for each transport format of a plurality of transport formats.

5. The method of claim 1, wherein the dynamically selecting comprises dynamically selecting based on the selected transport format for the transport block and a decoding performance for the transport block, the decoding performance is associated with at least one of:
a block error rate;
a reliability distribution of the plurality of bits in at least one code block;
a distribution of systematic bits and parity bits in the at least one code block.

6. A base station for transmitting a transport block to a user equipment in a communications network, the transport block comprising a plurality of bits, the base station configured to receive information about a reception quality from the user equipment; the base station comprising:
one or more processing circuits configured to function as a selector configured to:
select a transport format based on the reception quality; and
dynamically select, for a first transmission, a first redundancy version parameter based on the selected transport format for the transport block;
a transmitter configured to transmit, in a first transmission to the user equipment, the transport block with the plurality of bits distributed according to the selected first redundancy version parameter and according to the selected transport format,
wherein the one or more processing circuits are configured to select the transport format and the first redundancy version parameter jointly from a table comprising information about required signal reception quality at the user equipment for each combination of transport format and first redundancy version parameter of a plurality of transport format and first redundancy version parameter combinations.

7. The base station of claim 6:
wherein the one or more processing circuits are further configured to select a second redundancy version parameter based on the first redundancy version parameter;
wherein the transmitter is further configured to retransmit, to the user equipment, the transport block with the plurality of bits distributed according to the dynamically selected second redundancy version parameter and according to the selected transport format.

8. The base station of claim 6, wherein the one or more processing circuits are configured to further function as an updating unit configured to, based on the selected first redundancy version parameter, update the information about required signal reception quality in the table.

9. The base station of claim 6, wherein the table comprises information about an optimal first redundancy version parameter for each transport format of a plurality of transport formats.

10. The base station of claim 6, wherein the one or more processing circuits are configured to dynamically select based on the selected transport format for the transport block and a decoding performance for the transport block, the decoding performance is associated with at least one of:
a block error rate;
a reliability distribution of the plurality of bits in at least one code block;
a distribution of systematic bits and parity bits in the at least one code block.

11. A method, in a base station, for transmitting a transport block to a user equipment in a communications network, the transport block comprising a plurality of bits, the method comprising:
receiving information about a reception quality from the user equipment;
selecting a transport format based on the reception quality;
dynamically selecting, for a first transmission, a first redundancy version parameter based on the selected transport format for the transport block;
transmitting, in a first transmission, to the user equipment the transport block with the plurality of bits distributed according to the selected first redundancy version parameter and according to the selected transport format,
wherein the transport format is selected from a table comprising information about required signal reception quality at the user equipment for each transport format of a plurality of transport formats and for each first redundancy version parameter of a plurality of first redundancy version parameters.

12. The method of claim 11, further comprising:
selecting a second redundancy version parameter based on the first redundancy version parameter; and
retransmitting, to the user equipment, the transport block with the plurality of bits distributed according to the selected second redundancy version parameter and according to the selected transport format.

13. The method of claim 11, further comprising updating, based on the selected first redundancy version parameter, the information about required signal reception quality in the table.

14. The method of claim 11, wherein the table comprises information about an optimal first redundancy version parameter for each transport format of a plurality of transport formats.

15. The method of claim 11, wherein the dynamically selecting comprises dynamically selecting based on the selected transport format for the transport block and a decoding performance for the transport block, the decoding performance is associated with at least one of:
- a block error rate;
- a reliability distribution of the plurality of bits in at least one code block;
- a distribution of systematic bits and parity bits in the at least one code block.

16. A base station for transmitting a transport block to a user equipment in a communications network, the transport block comprising a plurality of bits, the base station configured to receive information about a reception quality from the user equipment; the base station comprising:
- one or more processing circuits configured to function as a selector configured to:
  - select a transport format based on the reception quality; and
  - dynamically select, for a first transmission, a first redundancy version parameter based on the selected transport format for the transport block;
- a transmitter configured to transmit, in a first transmission to the user equipment, the transport block with the plurality of bits distributed according to the selected first redundancy version parameter and according to the selected transport format,
- wherein the one or more processing circuits are configured to select the transport format from a table comprising information about required signal reception quality at the user equipment for each transport format of a plurality of transport formats and for each first redundancy version parameter of a plurality of first redundancy version parameters.

17. The base station of claim 16:
- wherein the one or more processing circuits are further configured to select a second redundancy version parameter based on the first redundancy version parameter;
- wherein the transmitter is further configured to retransmit, to the user equipment, the transport block with the plurality of bits distributed according to the dynamically selected second redundancy version parameter and according to the selected transport format.

18. The base station of claim 16, wherein the one or more processing circuits are configured to further function as an updating unit configured to, based on the selected first redundancy version parameter, update the information about required signal reception quality in the table.

19. The base station of claim 16, wherein the table comprises information about an optimal first redundancy version parameter for each transport format of a plurality of transport formats.

20. The base station of claim 16, wherein the one or more processing circuits are configured to dynamically select based on the selected transport format for the transport block and a decoding performance for the transport block, the decoding performance is associated with at least one of:
- a block error rate;
- a reliability distribution of the plurality of bits in at least one code block;
- a distribution of systematic bits and parity bits in the at least one code block.

* * * * *